United States Patent [19]

Ward

[11] 4,426,018

[45] Jan. 17, 1984

[54] METHOD AND APPARATUS FOR RECYCLING SCRAP

[76] Inventor: Dean L. Ward, Rte. 9, Box 262, Cumming, Forsyth County, Ga. 30130

[21] Appl. No.: 274,484

[22] Filed: Jun. 17, 1981

[51] Int. Cl.$^3$ .................. G01F 11/20; B67D 5/60; B67B 7/00; B65G 17/36
[52] U.S. Cl. .......................... 222/1; 366/76; 198/558; 264/DIG. 69; 222/133; 222/145; 222/411; 222/413
[58] Field of Search ............... 222/136, 133, 411, 413, 222/1, 145; 366/76, 156, 169; 425/205; 264/37, DIG. 69; 198/558

[56] References Cited

U.S. PATENT DOCUMENTS

| | | | |
|---|---|---|---|
| 3,797,702 | 3/1974 | Robertson | 222/136 |
| 3,822,809 | 7/1974 | Foucault et al. | 222/413 |
| 3,858,765 | 1/1975 | Landers | 222/413 |
| 3,967,722 | 7/1976 | Dietert | 222/413 |
| 3,999,921 | 12/1976 | Thor et al. | 366/76 |
| 4,261,520 | 4/1981 | Hetrick | 222/413 |

Primary Examiner—Robert B. Reeves
Assistant Examiner—Russell D. Stormer
Attorney, Agent, or Firm—Newton, Hopkins & Ormsby

[57] ABSTRACT

A plastic metering machine or assembly mounted on a plastic extruder, feeds plastic aggregate material of two different bulk densities simultaneously into the barrel of an extruder. The assembly has a housing which is divided into two compartments or hoppers by a downwardly converging wall which feeds into the mouth of a funnel on the upper end of a feed tube which passes through the lower compartment and terminates at its lower end adjacent to or in the entrance to the extruder. The feed tube has an external auger which, when the feed tube is rotated, meters the material in the lower compartment into the extruder. The feed tube also has outwardly extending arms which form anti-bridging elements for agitating the material in the lower compartment. A blower feeds plastic scrap material to a grinder which also receives sheet plastic scrap material and loose plastic scrap. The ground scrap from the grinder is fed into the lower compartment as the low bulk density material. The primary plastic aggregates (pellets or powder) plus such additives as are desired are fed into the upper compartment.

10 Claims, 5 Drawing Figures

METHOD AND APPARATUS FOR RECYCLING SCRAP

BACKGROUND OF THE INVENTION

(1) Field of the Invention

This invention relates to a method and apparatus of recycling scrap and is more particularly concerned with a plastic metering assembly and a method of feeding simultaneouly two different bulk densities of plastic material into a processing apparatus.

(2) Discussion of the Prior Art

In the past, mechanisms have been developed for simultaneously feeding scrap material of two different bulk densities into a processing machine, such as a plastic extruder. The prior art includes U.S. Pat. No. 3,797,702 which provides an internal auger which protrudes downwardly through a stationary feed tube and thence, through the bottom portion of a lower hopper, the auger simultaneously feeding aggregate material from an upper hopper and a lower hopper into a processing machine.

The prior art also includes U.S. Pat. No. 4,108,334 which discloses another type of apparatus for simultaneously feeding two densities of bulk material. The device of this patent includes a central rotatable shaft having rotary impellers and a side conduit which feeds sidewise into the stream of material fed by the main shaft. A second motor rotates, in the side conduit, a shaft provided with impellers for feeding this material into the main stream of material.

The prior art devices discussed above cannot achieve a high rate of speed in the feeding of plastic into the processing machine and do not accurately meter and vary the amount of low bulk density material fed to the extruder or other processing machine.

A search of the prior art also disclosed U.S. Pat. Nos. 1,268,813; 1,925,541; 2,517,456; 2,995,775; 3,148,412; 3,177,527; 3,182,969; 3,231,243; 3,386,707; 3,679,101; 3,871,629 and 4,014,462 which are believed to be less pertinent than the patents discussed above.

The significant difference between my scrap metering assembly and the prior art cited is that the scrap material (low bulk density) and the primary material (base or high bulk density) are kept separate from each other until both are forced simultaneously into the flights of the extruder screw of the extruder. The amount of scrap which may be reprocessed in an extruder is controlled first by the compression ratio of the extruder screw which defines the minimum bulk density of feed material which may be presented to it, and secondly the ability of the extruder screw to plasticize and homogenize the dissimilar mixture of materials presented to it (pellet and ground scrap). Most extruder screws are designed with a 2.5 to 3.0 compression ratio, this means that the volume of the extruder screw in the feed (unmelted) section is 2.5 to 3.0 times the volume in the metering (melted) section of the screw. For example, a typical extruder running low density polyethylene at a specific gravity of 0.928 with a screw having a compression ratio of 3.0 the minimum bulk density which may be introduced into the extruder screw feed section is $0.928 \times 62.4/3.0 = 19.3$ pounds per cubic foot. Since the bulk density of the primary (pelletized) plastic is approximately 35 pounds per cubic foot, it is apparent that the primary material may be blended with scrap material of a lower bulk density by continuing to add scrap material until the average bulk density reaches about 19.3 pounds per cubic foot. To continue to add scrap beyond this point would reduce the output of the extruder screw. The present invention achieves this blending to produce the desired density.

SUMMARY OF THE INVENTION

Briefly described, the present invention includes a plastic metering assembly which is mounted on an extruder or other processing machine. This metering assembly includes an outer housing having a downwardly converging frusto-conical bottom surface which converges toward and is connected to the upper end of an outer feed conduit. Within the central portion of the housing is a frusto-conical partition spaced from and above the bottom and which separates the housing into an upper compartment or hopper and a lower compartment or hopper. The lower end of the frusto-conical partition is open and overlaps the upper end of a funnel member connected to the upper end of a central hollow rotatable feed shaft or auger shaft which protrudes downwardly through the lower compartment and thence, through a hollow cylindrical downwardly extending outer feed conduit. A shaft protruding downwardly through the central portion of the upper hopper rotates both the funnel member and the central feed tube or auger shaft. The outer peripheral of the auger shaft is provided with an outwardly extending helical auger flight which urges the material from the lower hopper downwardly through the annulus between the auger shaft and the conduit, when the central auger shaft is rotated. The central auger shaft is also provided with outwardly protruding arms which agitate the material in the lower hopper and prevent bridging thereof. The material in the upper hopper is fed by gravity through the central auger shaft.

The primary use for my scrap recycling system is for recovering plastic film scrap. Most scrap film, when grounded, runs between 2 and 8 pounds per cubic foot. It is obvious that the amount of scrap which may be recovered is proportional to the bulk density of the scrap as it enters the extruder screw of the extruder.

The design presented in my invention allows the scrap to be removed from the lower hopper via the auger flight and be compressed to a much higher bulk density than exists in the free flowing form in the scrap hopper. This in turn, allows much higher percentages of scrap to be run into an extruder screw. The amount of compression of the fluff (low bulk density material) is independent of the presence of primary material in the inside of the auger shaft.

In recycling plastic scrap which is of a low bulk density characteristic it is essential that the mass feed rate of material be kept nearly constant to prevent surging in the extrusion process. A constant scrap feed rate results in a constant feed bulk density which transforms into a constant melt rate and pressure profile in the extruder. This is accomplished in my invention by forming an annulus of scrap which surround a core of primary material which is delivered through the center of the auger shaft. The rotating extruder screw under the vertical column of scrap and primary material in my machine is analogous to a meat slicer which slices off a uniform mixture of scrap and primary material with each turn of the extruder screw.

Accordingly, it is the object of the present invention to provide a plastic metering assembly which will simultaneously feed, to a plastic processing machine, such as an extruder, materials of two different densities.

Another object of the present invention is to provide a process and apparatus for feeding different density materials which will compress and positively meter prescribed and uniform amounts of light bulk density material into a processing machine, together with a prescribed amount of primary material.

Another object of the present invention is to provide a plastic metering assembly for recycling scrap plastic which assembly is particularly suited to recycle scrap film.

Other objects, features and advantages of the present invention will become apparent from the following description when taken in conjunction with the accompanying drawings wherein like characters referenced designate corresponding parts throughout.

DESCRIPTION OF THE PREFERRED EMBODIMENTS

Figure 1:
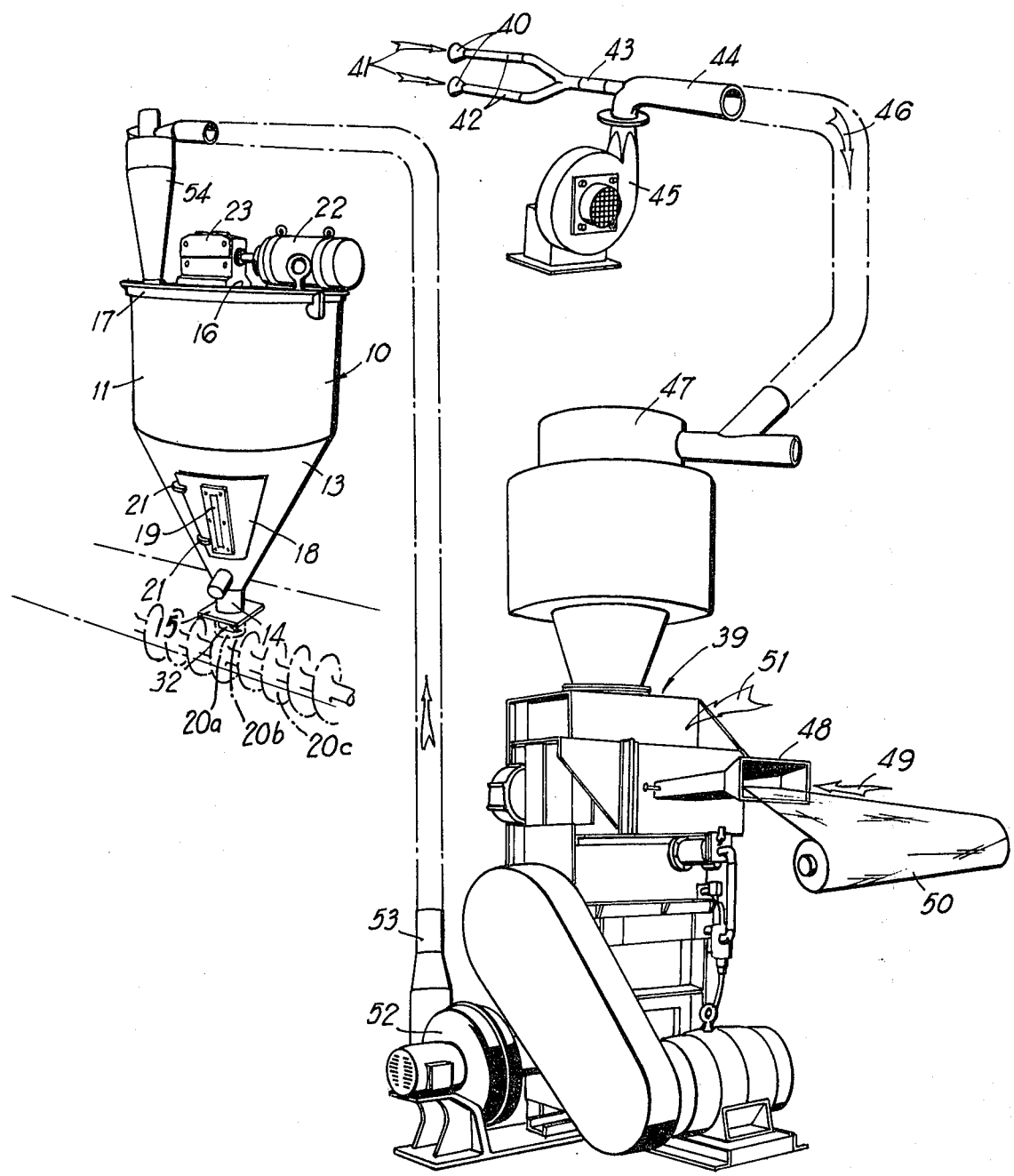
FIG. 1 is a perspective view of the plastic metering assembly constructed in accordance with the present invention, the metering assembly being shown as connected for receiving reprocessed scrap from a grinder.
Figure 2:
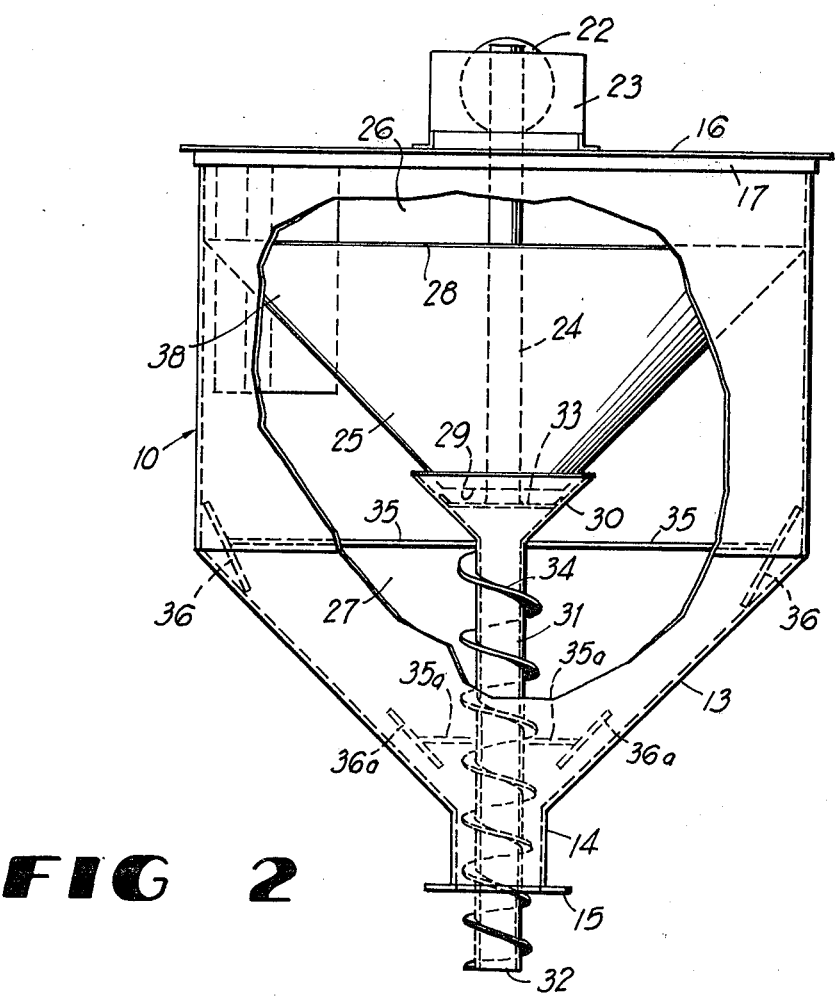
FIG. 2 is a fragmentary side elevation view of the plastic metering assembly disclosed in FIG. 1.
Figure 3:
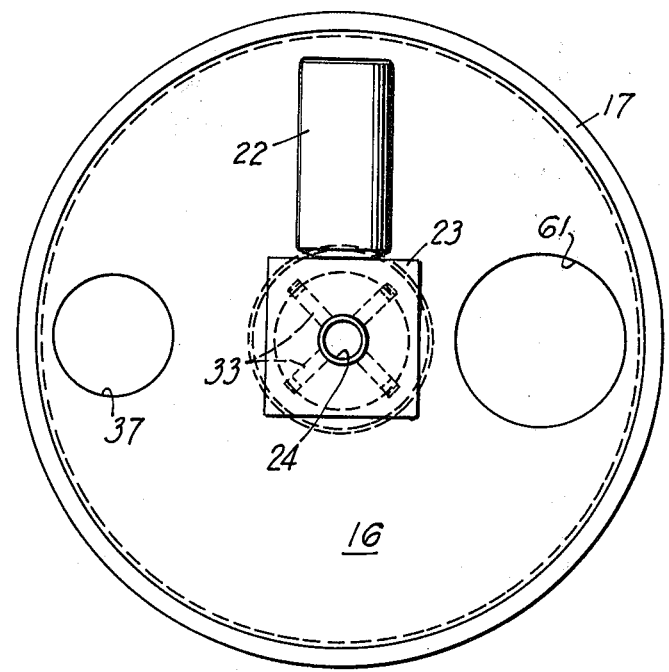
FIG. 3 is a top plan view of the plastic metering assembly disclosed in the FIG. 1 and 2.

Referring now in detail to the embodiments chosen for the purpose of illustrating the present invention, numeral 10, in FIGS. 1, 2 and 3 denote generally a sheet metal hopper or housing of the metering assembly of the present invention. This metering assembly, as best seen in FIG. 2, includes a hollow, cylindrical, vertically disposed upper housing or wall 11, the lower periphery of which is integrally connected to the upper edge of a frusto-conical downwardly converging bottom 13. The lower end of the bottom, 13 has a discharge opening and terminates at and is connected to the upper end of a downwardly extending hollow cylindrical outer feed tube or conduit 14. Conduit 14 is concentric about the vertical axis of housing 10 and is provided at its lower end with a square butt flange 15. The butt flange 15 is mounted on the feed section of an extruder, denoted generally by number 20, for feeding plastic material into the mouth or intake end of the extruder. The extruder 20 is a conventional construction and, therefore, a more detailed description of the extruder 20 is not necessary. It has a horizontal extruder screw 20a within its barrel 20c, the screw 20b progressively slicing across the vertical column of plastic material fed to the mouth 20a.

The upper end portion of the housing body 11 is provided with a removable flat cylindrical cover 16 having an annular downwardly protruding flange 17 which overlaps the upper end portion of the body 11. The bottom 13 is provided with a conventional access door 18 having a view window 19 therein. The door 18 is hingedly mounted to the bottom 13 by hinges 21, seen in FIG. 1.

Mounted on the top plate 16 is a variable speed motor 22 which drives a gear reducer 23. The gear reducer 23, in turn, drives a central downwardly protruding drive shaft 24 which protrudes axially into the upper portion of the interior of the housing 10 so as to terminate at approximately the central portion of the housing 10. The shaft 24 is thus disposed along the center line of the cylindrical wall 11.

Within the cylindrical wall 11 is a frusto-conical downwardly converging sheet metal partition 25 which separates the interior of the housing 10 into an upper compartment or hopper 26 and a lower compartment or hopper 27. The upper edge portion 28 of the partition 25 is secured to the inner periphery of the wall 11. The lower end portion of the frusto-conical partition 25 defines an open circular discharge mouth 29 which is disposed in a radial plane above the lower end of shaft 24. Thus, the material in the upper hopper 26 can feed by gravity down the incline of the partition 25 and through the mouth 29.

Disposed below the mouth 29 in overlapping relationship to the bottom portion of the partition 25 is a funnel member 30, the funnel member 30 converging downwardly at approximately the same angle as the partition 25 so that the lower end portion of the partition 25, overlaps the periphery of the funnel member 30 and the discharge mouth 29, is within the upper portion of the funnel member 30. The funnel member 30 converges downwardly and is secured by its lower central end portion to and communicates with the upper end of a vertically axially disposed, rotatable, hollow, tubular, auger shaft 31. The auger shaft 31 forms a feed tube which is concentric with conduit 14 and protrudes downwardly from funnel member 30 through the central portion of the lower compartment or hopper 27 and terminates with its lower end 32 extending into mouth 20a of the extruder or processing machine 20. The funnel member 30 is solely supported by and connected to and driven by the lower end of shaft 24 by means of a spider which is formed of four equally spaced radially extending arms 33, seen best in broken lines in FIG. 3. These arms 33 are secured to the lower end of the shaft 24 by their inner portions and secured by their outer portions to the inner surface of the funnel member 30. Thus, the motor 22 will rotate, through the gear reducer 23 and the shaft 24, the funnel 30 and the feed tube or auger shaft 31.

Surrounding the outer surface of the feed tube 31 and extending substantially throughout its length is an outwardly protruding helical auger flight or impeller 34. This auger flight 34 has a diameter which is slightly less than the inside diameter of the outer feed conduit 14. Usually the feed conduit 14 has an inside diameter which is approximately equal to the diameter of the intake port or mouth 20a of the extruder 20 and is aligned therewith. The auger flight 34 extends well below the lower end of the outer conduit 14 and hence protrudes into the mouth 20a of the extruder 20.

Protruding radially from the upper end portion of the feed tube or auger shaft 31 are a plurality of upper agitator arms 35, seen in FIG. 2. These asrms 35 are circumferentially spaced from each other and are provided with end paddles 35 which ride along the inner surface portion of the housing 10 at the junction of the cylindrical wall 11 and the bottom 13. Intermediate the ends of the feed tube or auger shaft 31 there are additional radially extending agitator arms 35a provided with paddles 35a at their outer ends. These paddles 36a ride along the inner surface of the bottom 13 as the tube 31 is rotated for agitating material in the central portion of compartment 27. When the auger shaft 31 is rotated, these arms 35, and 35a are also rotated so as to agitate the material in the lower compartment or hopper 27 so as to prevent bridging thereof and to tend to level the material therein so that it will flow downwardly.

As seen in FIG. 3, the top 16 is provided with a port 37 which communicates with a vertically disposed chute 38 which passes through a peripheral portion of the partition 25 so as to discharge at its lower end, into the upper portion of the lower compartment or hopper 27, as illustrated in FIG. 2. The low bulk density material is fed through port 37 and thence through the chute 38 into the lower compartment 27. The low bulk density material can also be fed through the upper portion of bottom 13, directly into the lower hopper 27, if desired.

This low bulk density material is produced from scrap plastic material, such as edge trim, which are fed into the suction funnels 41, as indicated by arrows 41 in FIG. 1. The funnels 40 are connected to the suction ends of tubes 42 which lead to a single suction tube 43 connected to an air line 44. A blower 45 blows air into line 44 so as to create the suction on tube 43. This air line 44 feeds, as indicated by arrow 46, into a cyclone 47 and thence into a vertical grinder 39. Additional scrap material, such as plastic film from egg cartons and film from ground soap is fed through a trumpet 48, as indicated by arrow 49, the film being denoted generally by a numeral 50. Furthermore, loose scrap can be fed into the grinder 39 as indicated by arrow 51.

When ground, the scrap is fed by blower 52 through a conduit 53 into a cyclone 54 mounted in communication with and for discharging into port 37. This low bulk density material, formed by the plastic scrap is non-freeflowing and has a density of less than 15 pounds per cubic foot. This material falls by gravity through the chute 38 and into the lower compartment 27 where it is continuously agitated by arms 35, and 35a as the shaft 24 rotates the feed tube or auger shaft 31. this low bulk density scrap material is fed by the auger 34 through the outer conduit 14 and thence into the mouth or intake end 20a of extruder 20 as an annulus. The speed of rotation of the motor 22 determines the feed rate for the low bulk density material fed from the hopper 27 into the extruder 20. Hence, the feed may be readily changed, as desired.

The primary plastic material, which is in aggregate form, such as in pellets or powder, is fed into the upper compartment 26 through a port 61 in the top 16.

The primary plastic material and its additives have a high bulk density usually equal to or in excess of 15 pounds per cubic foot. This high bulk density material is essentially free flowing and therefore flows by gravity down the incline surface of the partition 25 and thence into the rotating funnel member 30, being directed by the funnel 30 into the upper end of the feed tube 31 where it falls by gravity into the extruder 20, passing out of the discharge mouth 32 of the tube 31.

From the foregoing description, the operation of the present invention should be apparent. Scrap material is fed as indicated by the arrows 41, 49, and 51 into the grinder 30 where the scrap material is ground and fed by blower 50 to the cyclone 54 which drops the scrap material through the chute 38 and into the lower compartment or hopper 27. Furthermore, the primary plastic material is fed directly into the upper compartment 26 through port 61 and is then fed, by gravity, down through the central feed tube 31 and into the extruder mouth 20a. As the low bulk density material is fed by the auger flight 34 out of the lower end portion of the compartment 27 into the extruder 20. The upper periphery of the extruder screw 20b as it rotates, slides progressively and successively across the vertical column of plastic material housing an annulus of recycled compressed scrap and a core of primary material which is thus presented to a common position adjacent the periphery of the screw 20b.

Figure 4:
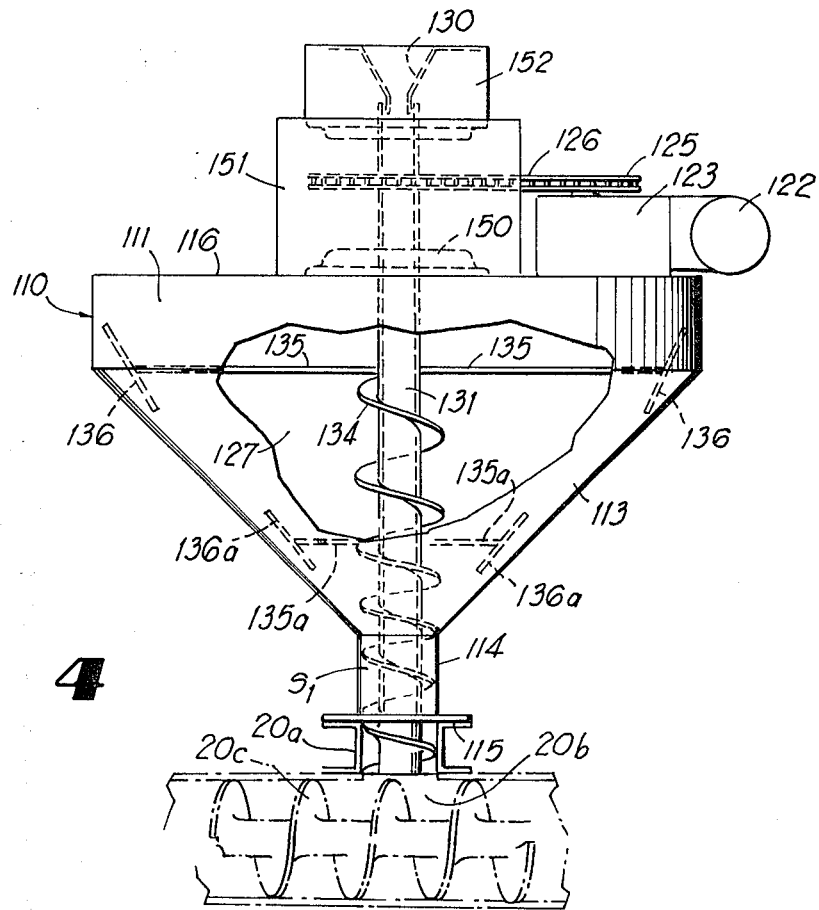
FIG. 4 is a fragmentary side elevational view of a second embodiment of the plastic feeder assembly of the present invention.
Figure 5:
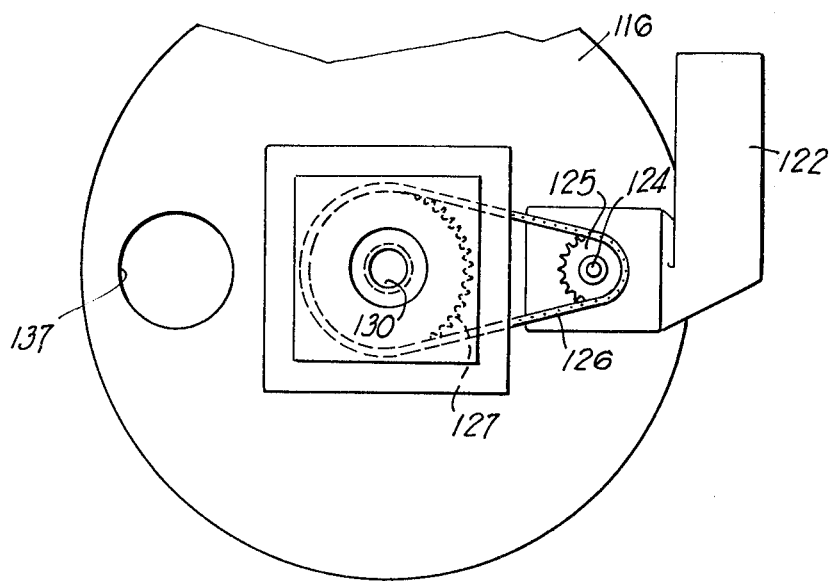
FIG. 5 is a fragmentary top plan view of the device shown in FIG. 4.

In the second embodiment, depicted in FIGS. 4 and 5, the housing 110 has a cylindrical upper wall 111 provided with a flat top 116 and a frusto conical bottom 113 having a central discharge opening. A motor 122 drives a gear reducer 123 which is mounted on the top 116. This gear reducer 123 has an upstanding shaft 124 which is parallel to an offset from the vertical axis of hopper 110. This shaft 124 is provided with a sprocket 125 which drives a continuous chain 126 for rotating a sprocket 127 mounted on an axially disposed vertically extending feed tube or auger shaft 131. The auger shaft 131 extends downwardly in housing 110 and through the opening in its lower end. The lower end portion of auger shaft 131 is concentric with and protrudes through the discharge conduit 114 and into the throat 120a of the extruder 120. Thus, an annular space $S_1$ is provided between the discharge conduit 114 and the lower end portion of the auger shaft 131. A helically disposed auger flight 134, similar to auger flight 34, is mounted around the outer periphery of auger shaft 131 and this auger flight 134 extends vertically along the lower portion of the auger shaft 134, its lower portion extending throughout the annual space $S_1$ and into the throat 120a to terminate at the lower end of auger shaft 131. The lower end portion of the tube or conduit 131 is provided with radially extending, axially and circumferentially spaced agitator arms 135 and 135a which are respectively provided with paddles 136 and 136a in the same manner as the arms 35 and 35a and the paddles 36 and 36a are provided on tube 31.

Tube 131 above auger flight 134 is rotatably supported in place by a bearing 150 which is mounted on the top plate 116. A closure member 151 is provided around the upper portion the shaft 131 and sprocket 127, the member 151 having openings for the chain 126. On this closure member 151 is mounted a funnel supporting member 152 provided with a feed funnel or funnel member 130. The funnel member 130 is stationary but communicates with the upper end of the hollow feed tube or auger shaft 131 and provides an entrance opening therefor, through which the primary, high bulk density, raw material is introduced into the metering assembly. The low bulk density material is introduced through a port 137 in top plate 116 into the hopper of housing 110. The housing 110 is mounted by butt plate 115 on an extruder or other processing machine 120. The extruder 120 has a vertical throat 120a communicating with a horizontal barrel 120b provided with an extruder feed screw 120c. The Auger 134 and the shaft 131 protrude into throat 120a. The discharge from the hopper 110 is fed as an annulus by auger 134 when the shaft 131 is rotated. The annulus surrounds the primary material and is simultaneously removed by the feed screw 120c.

Again, through the regulation of the speed rotation motor 122, the amount of low bulk density material fed by the auger 134 from the lower hopper or compartment 127 is regulated, as desired.

It will be obvious to those skilled in the art that many variations may be made in the embodiments here chosen for the purpose of illustrating the present invention without departing from the scope thereof as defined by the appended claims.

I claim:

1. A metering assembly for feeding aggregate materials of different characteristics to a common area comprising:
   (a) a housing having a lower discharge opening;
   (b) a partition separating said housing into an upper hopper and a lower hopper, said lower hopper communicating with said discharge opening;
   (c) an upright hollow, tubular, rotatable auger shaft communicating at its upper end with said upper hopper and passing downwardly through said lower hopper and through said discharge opening, said auger shaft having an open hollow interior throughout its length and an open lower end for discharging aggretate material by gravity from said upper hopper, through said open hollow interior and out of said open lower end;
   (d) an auger flight carried by and protruding outwardly from the outer surface of said auger shaft for rotation therewith for contacting aggregate material in said lower hopper and for urging the aggregate material therein out of said discharge opening when said auger shaft is rotated; and
   (e) means for positively rotating said auger shaft for causing said auger flight to urge the aggregate material of said lower hopper out of said discharge opening without materially interfering with the flow by gravity of the aggregate material from said upper hopper through said hollow shaft.

2. The metering assembly defined in claim 1 wherein said partition is frusto-conical and has a lower central opening communicating with the interior of said auger shaft through the upper end of said auger shaft.

3. The metering assembly defined in claim 2 including a funnel member connected to the upper end of said auger shaft and being rotatable therewith, the outer portion of said funnel member and the inner lower portion of said partition overlapping each other.

4. The auger assembly defined in claim 3 wherein said means for rotating said auger shaft includes motor means mounted on said hopper, a drive shaft protruding downwardly through said upper hopper and connected to said auger shaft and a motor driving a said drive shaft.

5. The metering assembly defined in claim 1, including an outer conduit surrounding the lower portion of said auger shaft and the lower portion of said auger flight, and connected by its upper end to said housing, said conduit communicating by its upper end and with said lower discharge opening.

6. The metering assembly defined in claim 1, including agitator arms protruding from said auger shaft into said lower hopper for agitating material disposed therein when said auger shaft if rotated.

7. A metering assembly for feeding aggregate material of different characteristics to a common area comprising:
   (a) a housing having a lower discharge opening; (b) an upright, hollow tubular, rotatable, auger shaft disposed within said housing with its lower end protruding through said lower dischage opening, said hollow shaft having an open upper end and being open at its lower end;
   (c) means for rotating said auger shaft about its axis;
   (d) an outwardly flowing funnel member communicating with said open upper end of said auger shaft for directing aggregate material by gravity into said open upper end so that said aggregate material then passes by gravity through the hollow interior of said auger shaft and out of its open lower end;
   (e) an auger flight extending outwardly from and surrounding said auger shaft for rotation by said shaft when said shaft is rotated for engaging material within said hopper and for urging the engaged material out of said discharge opening when said auger shaft is rotated without materially interfering with the flow by gravity of the material through said hollow interior.

8. The metering assembly defined in claim 7, including a hollow, tubular, cylindrical, outer conduit mounted by its upper end onto said housing, around and communicating with said lower discharge opening, said auger flight extending into said conduit, said conduit and said auger shaft being hollow, cylindrical members and being concentrically disposed with respect to each other for defining an annular space therebetween, the lower portion of said auger flight being within said annular space.

9. The metering assembly defined in claim 8 including a sprocket on the upper end portion of said auger shaft, and wherein said means for driving said auger shaft includes a motor mounted on said housing, a sprocket mounted on said motor, and a chain extending around the sprocket of said motor and the sprocket of said auger shaft for driving said auger shaft when the sprocket of said motor is rotated by said motor.

10. The metering assembly defined in claim 8 including an extruder having a throat, a barrel communicating with said throat and a feed screw within said barrel, the feed screw passing adjacent to said throat, said housing being mounted on said extruder with its discharge opening communicating with said throat, said auger shaft and said auger flight protruding into said throat.

* * * * *